Oct. 14, 1969  W. W. PORTER  3,472,009
ASPARAGUS HARVESTER
Filed Sept. 1, 1965  6 Sheets-Sheet 1

INVENTOR
WELLINGTON W. PORTER.
BY
ATTORNEY

INVENTOR
WELLINGTON W. PORTER.
BY F. P. Keifer
ATTORNEY

United States Patent Office 3,472,009
Patented Oct. 14, 1969

3,472,009
ASPARAGUS HARVESTER
Wellington W. Porter, R.D. 2, Dublin Road,
Waterloo, N.Y. 13165
Filed Sept. 1, 1965, Ser. No. 484,326
Int. Cl. A01d 45/00
U.S. Cl. 56—327                                    10 Claims

ABSTRACT OF THE DISCLOSURE

Harvester for asparagus having wheels, an elevating conveyor extending fore and aft, with its forward end disposed close to the ground, a reciprocating cutter disposed substantially at ground level, and immediately ahead of the lower end of the conveyor, an apron extending upwardly from the cutter tangential to the upper side of the lower end of the conveyor, a pair of sprocket chains with the lower reaches spaced above the cutter and the lower end of the conveyor, baffle plates secured to said chains at uniformly spaced intervals for sweeping closely over the cutter and upwardly along the conveyor at substantially ground speed, a second conveyor extending to a gravity discharge area, and a blower for creating an updraft at the discharge area.

---

Figure 1:
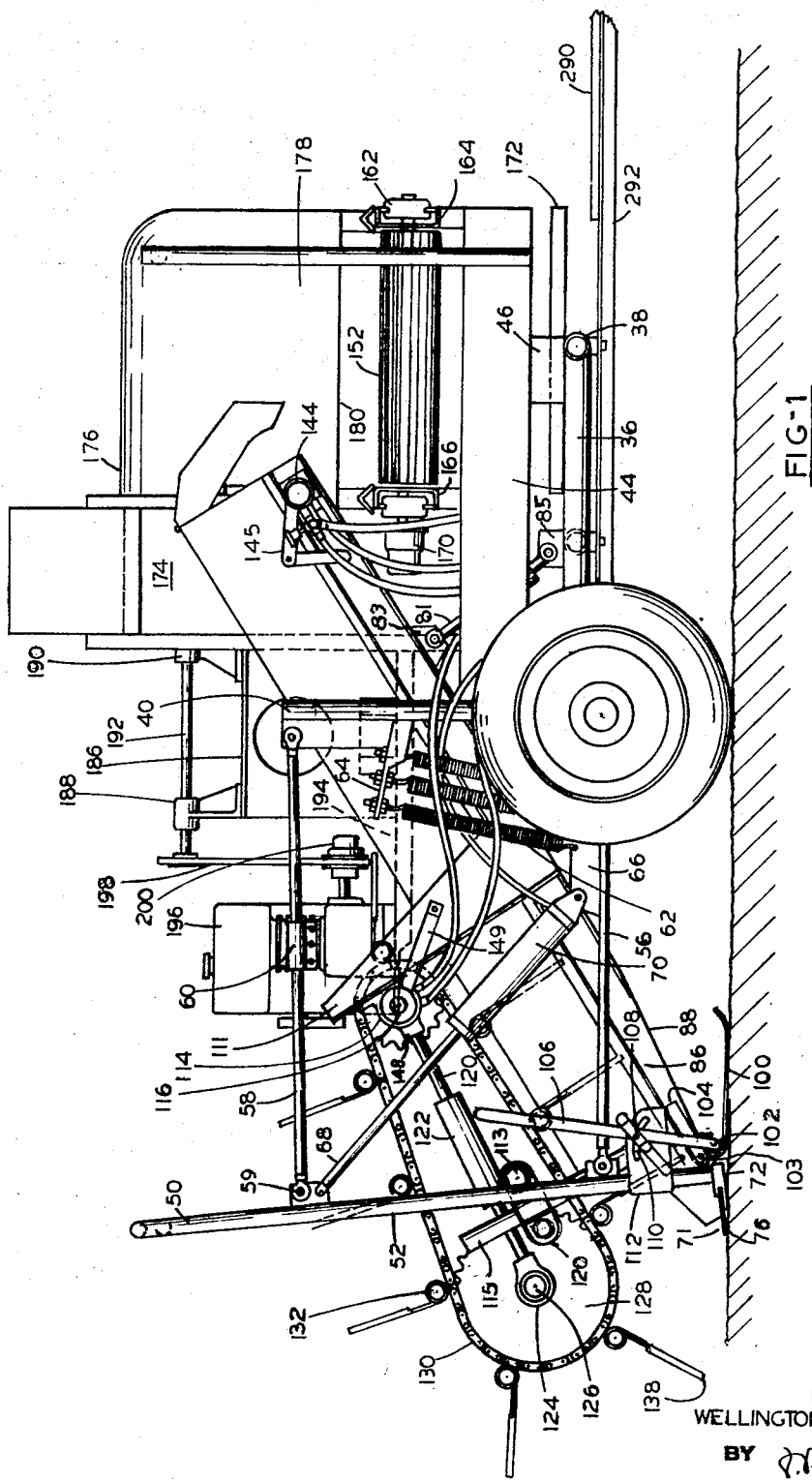

This invention relates to harvesters and more particularly to harvester for asparagus.

The harvesting of asparagus, as accomplished manually, requires considerable labor since it is necessary to cover the asparagus bed on many successive days in order to harvest the full grown asparagus stalk. While such full grown stalks are harvested for the farmer's market, it is not requisite that the harvest be restricted to full grown stalks for canning and frozen food packaging. During good weather conditions, asparagus stalks may appear and grow to full height within the passage of a day or so and such stalks emerge from the ground in this manner over a period of a number of weeks.

The present invention is directed to an apparatus for quickly covering large acreage of asparagus beds and harvesting the asparagus stalks close to the ground whether full height or of less maturity, it being desirable to be able to cover the acreage quickly and effectively every day or so during the extended harvest season.

The apparatus employs a cutter adapted to cut substantially at ground level all stalks which may have emerged since the last harvest. Immediately upon the cutting thereof, the stalks are swept onto elevating conveyors which carry the stalks and any other-debris to the rear of the apparatus where the stalks are discharged into an open crate, and separated from lighter material which may be airborne and discharged by blower operation to one side of the apparatus, as the apparatus is drawn over the asparagus beds.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
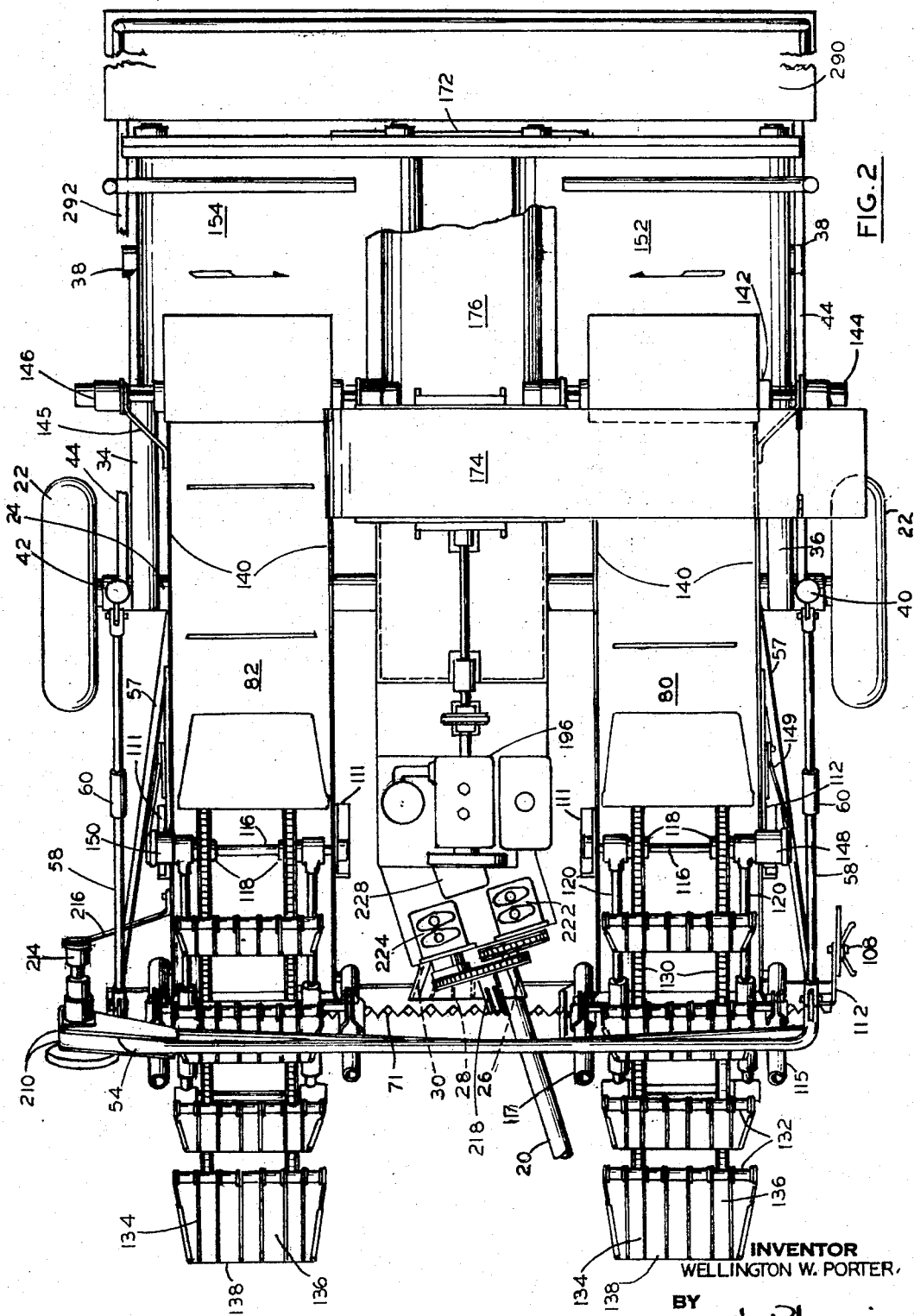
Figure 3:
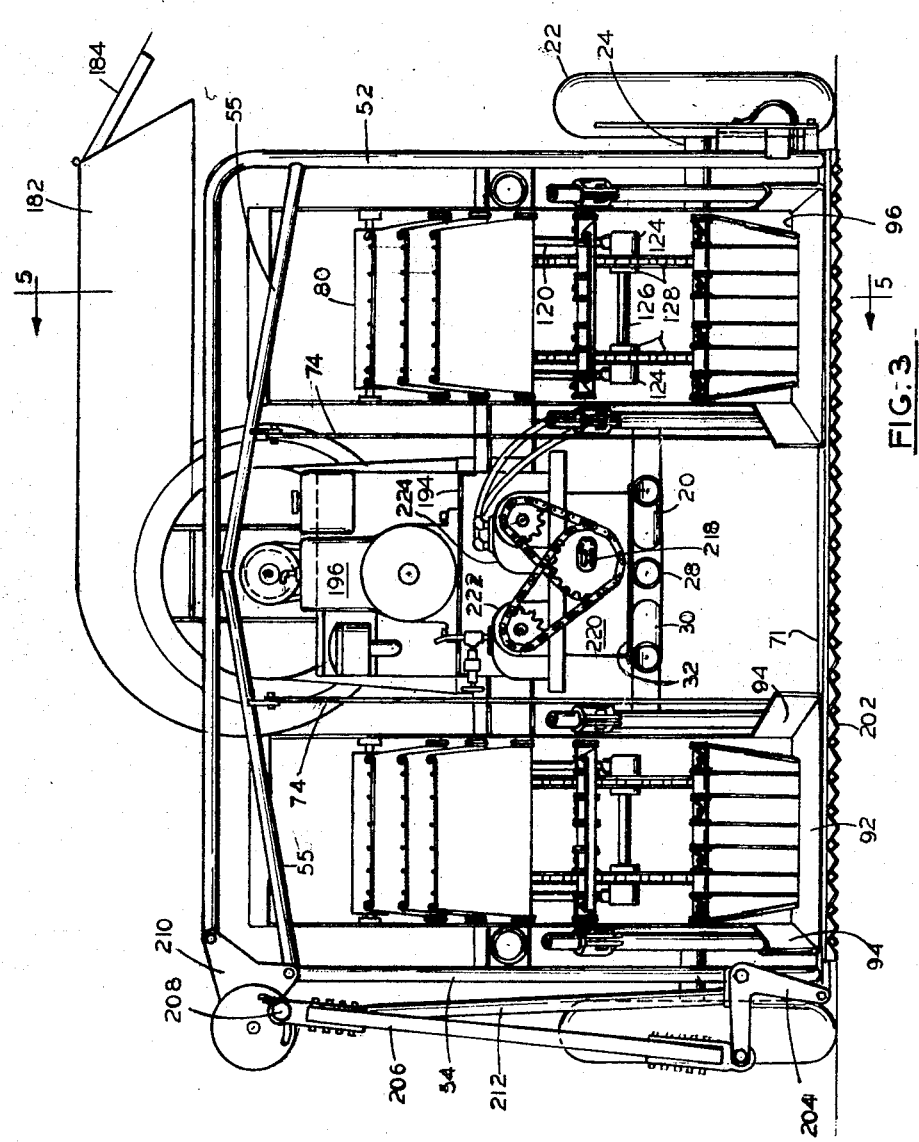
Figure 4:
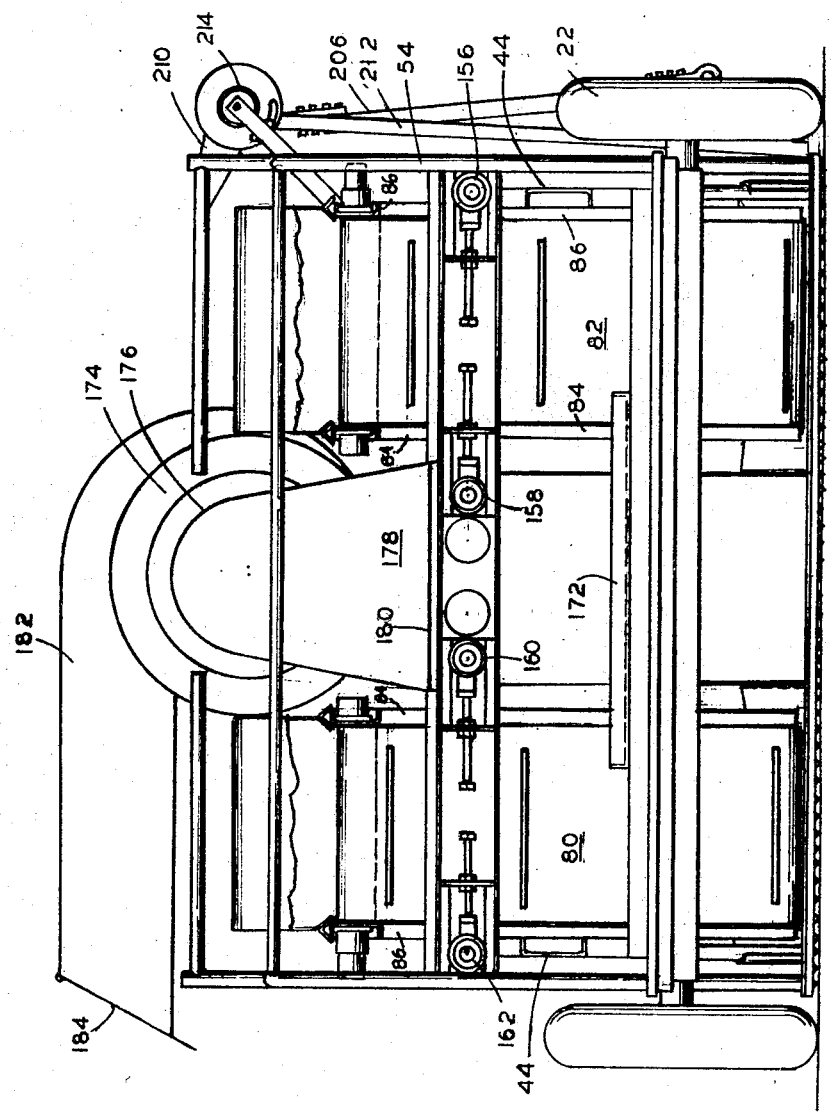
Figure 5:
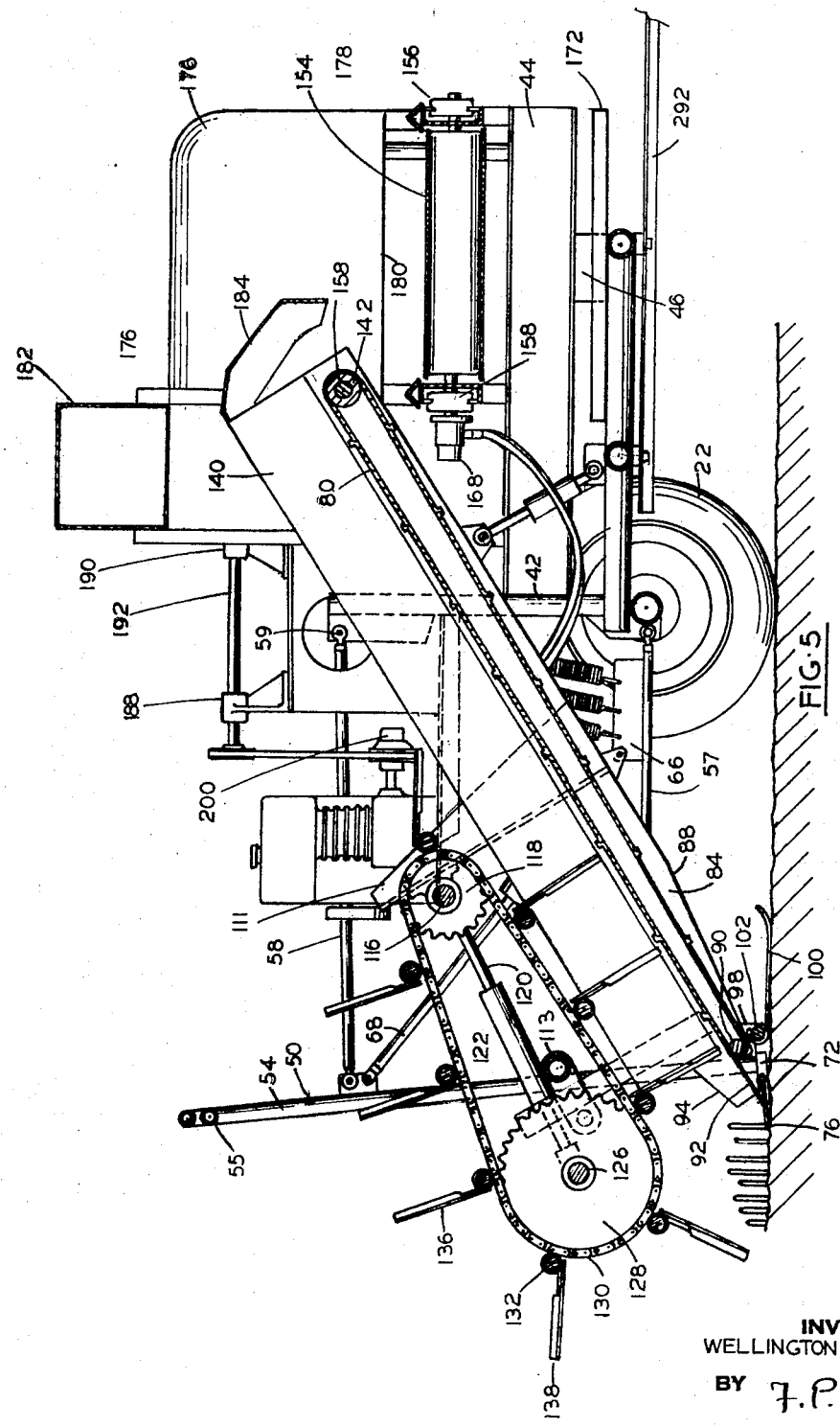
Figure 6:
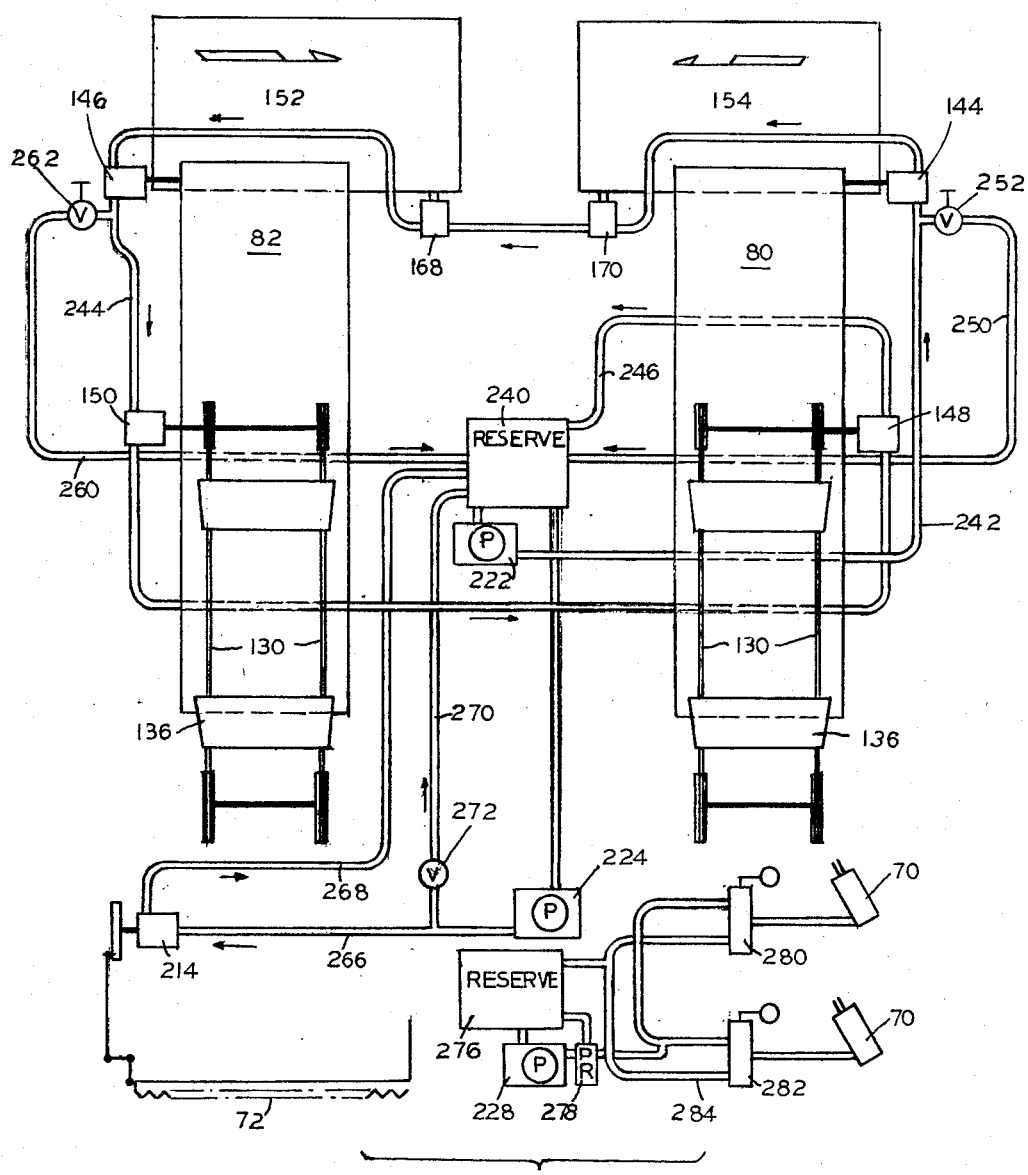

In the drawings, wherein like reference characters indicate like parts:

FIGURE 1 is a side elevational view of the harvester;
FIGURE 2 is a top plan view of the harvester;
FIGURE 3 is a front elevational view of the harvester;
FIGURE 4 is a rear elevational view of the harvester;
FIGURE 5 is a longitudinal section taken substantially on the line 5—5 of FIGURE 3, and FIGURE 6 is a diagrammatic illustration of the hydraulic control system.

Referring to FIGURES 1 and 2, there is shown a harvester for asparagus which is adapted to be drawn over asparagus beds by a tractor attached to a drawbar 20. The harvester is provided with ground-engaging wheels 22 and mounted on the opposite ends of a transverse axle 24. The wheels are spaced about nine feet which is sufficient to straddle two lengthwise beds of apparagus, it being understood that the asparagus is planted in lengthwise beds which spread in width up to a foot or more. The drawbar 20 as shown in FIGURE 2 is inclined to the left in order to be secured to a tractor, whose wheel tread may be only sufficient to straddle a single asparagus bed or row. Provision is made in the framework of the apparatus for inserting the drawbar 20 into any one of three sockets 26, 28, and 30, which are rigidly affixed to a main tubular frame member. The center tubular drawbar receiving member 28 may be a main frame member extended rearwardly to the center of the axle 24, to which it is welded, and the drawbar sockets 26 and 30 may be affixed by welding to the tubular member 28 through a plate 32.

Extending rearwardly from the axle 24 is a rectangular frame made up of tubular members 34, 36 and 38, and extending upright from the axle immediately inside each of the wheels are vertical tubular columns 40 and 42. Extending rearwardly from the vertical columns 40 and 42 are channel members 44, which are welded to the columns or supports 40 and 42, and supported from the frame members 34 and 36 by plates 46.

Disposed forwardly of the supports 40 and 42 is a forward U frame 50, which, as seen in FIGURE 3, comprises uprights 52 and 54, suitably braced as at 55. The uprights 52 and 54 of the forward frame are connected to the uprights 40 and 42 by two pairs of pivoted links 56 and 58 which provide a somewhat parallelogram linkage whereby the forward frame 50 may be elevated and lowered with reference to the rest of the frame. The links 58 are provided with an adjustment 60 so that the length thereof may be varied within limits, and whereby the frame 50 may be tilted as desired, for reasons which will appear hereinafter.

Each of the parallel frames on either side of the harvester are partially supported, or counter-balanced, by tension springs 62, extending diagonally between brackets 64 attached to the uprights 40 and 42, respectively, such springs also being attached to plates 66 affixed to the links 56 of each pair. Extending diagonally from the plates 66 to points adjacent to pivots 59 of the links 58 of each pair, are hydraulic struts 68, each having a cylinder and piston 70 whereby the length of the struts may be varied to raise and lower the forward frame 50 by controlled oil pressure. The structure employed is similar in many respects to that shown in U.S. Letters Patents, #2,729,049, #2,674,838 and #2,614,379 wherein the pivots 59 afford universal movement.

Disposed across the lower end of frame 52 is a reciprocating cutter 71 of a type disclosed in U.S. Letters Patent No. 2,706,374. The stationary plate 72 of such cutter is welded to the lower ends of uprights 52 and 54 and supported centrally of the apparatus by bars 74 which are secured to the bracing 55. By tilting the frame 50 through the adjustments 60, the teeth 76 of the cutter may be caused to be disposed immediately above the ground level.

Extending rearwardly from the plate 72 on either side of the machine are inclined elevating endless belt conveyors 80 and 82. Each conveyor comprises side members 84 and 86, which are in the form of channel irons. The lower ends thereof are tapered on the underside as in 88 to reduce the thickness of the conveyor at the lower end immediately above and behind the cutter 71. The conveyor belt at the lower end travels over a roll 90 having a minimum diameter of about one inch. An apron 92, having converging side flanges 94 has its lower lip secured against the upper surface of the cutter plate 72 and its upper edge 96 disposed immediately above the lower end of the conveyor belt of the respective conveyors 80 and 82 as it pivots around the rolls 90.

The lower end of each of the conveyors 80 and 82 is pivotally supported from a pair of spaced plates 98 extending upwardly and rearwardly from the cutter plate 72 on opposite sides of each conveyor. Arms 104 affixed to the outside of each of channels 84 and 86 are pivotally attached as at 103 to the plates 98 on the approximate axis of the rolls 90. Ground shoes 100 are provided to fix the location of the cutter teeth 76 with respect to the ground level. Preferably a pair of shoes for each conveyor are affixed to a shaft 102 which is pivotally mounted to the rear of plates 98. The shaft of each pair of shoes is provided with a hand lever 106 affixed to the end of the shaft. Such lever is secured in any selected position by a clamp bolt 108 extending through an arcuate slot 110 in plate 112, each of such plates being welded to the uprights 52 and 54 respectively.

Extending upwardly from each of the side members 84 and 86 of each of the conveyors 80 and 82, are bearing support arms 111, each arm of which is provided with a bearing 114 to receive the opposite ends of a shaft 116, upon which are mounted a pair of spaced sprockets 118. Also, journaled upon the shaft 116 are reach rods 120 which are adjustable in length, as at 122, and which extend forwardly and downwardly and terminate in journals 124, in which a second sprocket shaft 126, having spaced sprockets 128, is journaled. Endless chains 130 extend between the sprockets 118 and 128 and carry transverse bars 132 at spaced intervals along the length of the chain.

Such bars are provided with a plurality of yielding spring members 134 which back up plates of sheet metal 136 which are of generally trapezoidal configuration. The free edges 138 of each of said plates are attached so as to sweep closely over the cutter teeth 76 and move upwardly along the apron, and immediately above the belt of the conveyor of the respective conveyors 80 and 82. The plates 136 are adapted to assure the movement of the asparagus cuttings across the top face of the cutter assembly and upon the apron 92 and onto the belt of the conveyor of the respective conveyors 80 and 82, and such plates also assist and assure that the conveyors 80 and 82 elevate the harvest to the upper end thereto near the rear end of the apparatus. The upper ends of each of the conveyors are supported by adjustable struts, such as 81, connected to a transverse member 83 affixed beneath the conveyor channel members, and a transverse member 85 affixed to and disposed between the frame members 34 and 56. Each of the conveyors 80 and 82 are provided with side plates 140.

The height of the forward sprocket shafts 126 above the cutter, aprons and lower end of the conveyors is adjustable, the reach bars 120 being supported on a transverse bar 113 adjustably supported on tubular uprights 115 and 117 affixed at their lower ends to the channel iron side members 84 and 86 of the conveyors 80 and 82.

Each of the conveyors have an upper roll 142 of about four inches in diameter, which are driven by hydraulic motors 144 and 146. Each of the sprocket shafts 116 are driven by hydraulic motors 148 and 150. Such motors are provided with torque arms as is indicated at 145 and 149.

The upper ends of the conveyors 80 and 82 discharge upon a pair of conveyors 152 and 154 which move the harvest toward the center of the apparatus. Such conveyors are mounted on end rolls carried in journals 156, 158, 160 and 162, respectively, adjustably mounted in spaced channel sectioned frame members 164 and 166, extending crosswise of the apparatus towards the rear thereof, and are supported upon the channel members 44, on opposite sides of the apparatus. The adjacent shafts of the conveyors 152 and 154 are driven by hydraulic motors 168 and 170 and the conveyors 152 and 154 are adapted to discharge the asparagus harvest downwardly into an asparagus crate, carried on the platform 172 located below the adjacent ends of the conveyors 152 and 154.

In order to remove from the harvest light material, such as dirt, leaves, weeds and the like, a blower 174 is provided, such blower having its inlet duct 176 leading to an apron 178, the lower open end 180 end of which is disposed over the adjacent ends of the conveyors 152 and 154. The blower is provided with a discharge duct 182 having a gravity closed damper 184 over its discharge end. The blower creates a substantial upward draft through the space between the adjacent ends of the conveyors 152 and 154, whereby to draw off all light material that may be airborne by the upward airstream created by the blower.

The blower is mounted behind a platform 186 having bearings 188 and 190 for the blower shaft 192, the platform 186 being mounted upon a deck 194 suitably supported above the frame of the apparatus in such manner as desired. Upon the platform 194 is an internal combustion engine 196 having a belt drive 198 to the blower shaft 192 through a clutch 200.

The reciprocating cutter 202 of the cutter bar assembly is actuated through a bell crank 204 pivoted on the upright 54 of the frame 50 and the bell crank is driven through pitman 206, connected to a crank 208. The crank is journaled in supports 210 affixed to the upper end of the column 54, the journal for the crank being strengthened by a second column member 212 affixed to column 54 at its lower ends and to the plates 210 at its upper ends. The crank 210 is driven by a hydraulic motor 214 having a torque arm 216.

Power for driving the cutter bar, the chain driven sweep plates 136, the conveyors 80 and 82 (and conveyors 152 and 154, is derived from the power shaft of the tractor employed to draw the harvester along the asparagus beds, the power output shaft of the tractor being coupled to a jack shaft having a spline 218 for the purpose, such shaft being suitably journaled in support 220 in any suitable fashion. The splined jack shaft drives oil pumps 222 and 224, through sprockets and chains as indicated. Pump 222 supplies oil under pressure to actuate the hydraulic motors 148, 150, 144, 146, 168 and 170, while pump 224 actuates cutter bar motor 214. A third pump 228 also chain driven (not shown) from the jack shaft provides oil pressure for actuating the strut cylinders 70, to lift the frame 50, and cutter clear of the ground when desired.

In FIGURE 6 is shown the hydraulic drive circuits employed to actuate the mechanism from the tractor power take off, coupled to the splined end 218 of the jack shaft. In FIGURE 6, a reserve supply of oil, 240 which may be located below the deck 194, supplies oil to pump 222 and 224, which run continuously with the jack shaft. From pump 222, oil under pressure is delivered in sequence by conduit 242 to hydraulic motors 144, 170, 168 and 146, all of which are of the same speed, and drive conveyor rolls of the same diameter of conveyors 80, 82, 152 and 154. Oil leaving motor 146 is led to motors 150 and 148 by conduit 244, and oil returns to the sump or reserve 240 by conduit 246. Since it is desirable to have the sweeps 136 travel at a speed close to that of the belts of conveyors 80 and 82, the motors 150 and 148 operate at about half the speed of motors 144, 170, 168 and 146. Since the sprocket 118 may be about 8 inches in diameter or double the diameter of the rolls 142 the travel speed of the sweeps is about that of the conveyor.

If for any reason a lower speed of operation for all of the conveyors and sweeps is desired, a manually controlled bypass 250, controlled by a conveniently located valve 252 is provided. Opening the valve 252, to varying degrees, will slow the motors down, since part of the hydraulic fluid is bypassed back to the sump through conduit 250. If full bypass is permitted all motors 144, 170, 168, 146, 150 and 148 will be stopped.

In order to allow the conveyors to operate, while stopping the sweeps, or to allow the speed of the sweeps to be reduced while the conveyors operate at full speed, a second bypass 260 to the sump is provided, with a conveniently located valve 262, which when opened to a varying degree, the speed of motors 150 and 148 is reduced. If valve 262 be opened wide, motors 150 and 148 are stopped.

Control of the cutter bar motor 214 is effected in the same manner, the motor being supplied by pump 224 through conduit 266, with a return to sump 268. A bypass 270, provided with a valve 272 is provided. Bypassing a part or all of the output of pump 224 results in the cutter bar being reciprocated more slowly, or stopped.

A third pump 228, operating from oil in reserve 276 is used to actuate the lift cylinders 70. The output of the pump 228 is provided with a pressure relief 278. Pressure is supplied cylinders 70 through manually controlled three-way valves 280 and 282, which either admit oil into cylinders 70, hold the oil so admitted, or open the cylinders to the sump or reserve 276 through conduit 284. In practice, it is desirable to tie both valves 280, 282 together so as to obtain uniform lift of both cylinders, since if the apparatus is drawn by a tractor, the operator of the tractor will lift the cutter temporarily to pass over any obstruction, and since the tractor operator is the likely individual to see obstructions, he cannot look back to selectively lift one or the other side of the cutter, by powering only one cylinder 70.

A rear platform 290 supported from arms 292 detachably and adjustably fixed to the underside of the frame members 36, 34 and 38 provide a location for an observer to ride, who may adjust the speed of the conveyors and sweeps to suit harvester speed.

It will be seen that by lengthening the links 58, the forward frame 50 is tilted, and the cutter teeth 76 are brought substantially to ground level, so that any asparagus of any substantial height is cut, whether it be a tip or a long stalk. The forward frame is steadied against lateral sway by inclined links 57, on either side which brace the links 56, the links 57 being pivoted just forward of the axle on pivots aligned with the pivots of links 56.

While a single form of the invention has been illustrated and described, it is to be understood that the invention is not limited thereto. Various changes in the construction and arrangement may be made without departing from the spirit of the invention, as will be apparent to those skilled in the art.

What is claimed is:

1. An asparagus harvester comprising, a frame having ground engaging wheels, an inclined elevating conveyor extending fore and aft, with its forward end disposed close to the ground, reciprocating cutter means carried by the frame forward of the wheels and disposed substantially at ground level, and immediately ahead of the lower end of the conveyor, an apron extending upwardly from the cutter means tangential to the upper side of the lower end of the conveyor, a pair of endless chains carried on sprockets disposed above the conveyor with the lower reaches of the chains disposed substantially parallel with and spaced above the lower end of said conveyor, a series of transverse imperforate sweep plates secured to said chains at uniformly spaced intervals therealong and extending perpendicularly from the reaches thereof substantially to the conveyor, for sweeping closely over said cutter and upwardly over said conveyor, means for driving said sweep plates and said conveyor at substantially the same speed, means mounted on the frame for conveying the material lifted by said conveyor to a gravity discharge area, and blower means for creating an updraft at said discharge area for removing light materials from the asparagus harvest.

2. An asparagus harvester comprising, a frame having ground engaging wheels, an elevating conveyor extending fore and aft, with its forward end disposed close to the ground, a reciprocating cutter means carried by the frame forward of the wheels and disposed substantially at ground level, and immediately ahead of the lower end of the conveyor, an apron extending upwardly from the cutter substantially coplanar with the upper side of the lower end of the conveyor, a pair of endless chains carried on sprockets disposed above the conveyor with the lower reaches of the chains disposed substantially parallel with and spaced above the lower end of said conveyor, a series of imperforate sweep plates secured to said chains at uniformly spaced intervals therealong and extending perpendicularly from the reaches thereof substantially to the conveyor, for sweeping closely over said cutter and upwardly over said conveyor, means for driving said sweep plates and said conveyor at substantially the same speed, substantially horizontal conveyor means mounted on the frame and disposed beneath the upper end of said elevating conveyor for conveying the material lifted by said conveyor to a gravity discharge area, and blower means for creating an updraft at said discharge area for removing light materials from the asparagus harvest.

3. An asparagus harvester comprising, a frame having a pair of ground engaging wheels and a drawbar adapted for attachment to a tractor, an elevating conveyor extending fore and aft, with its forward end disposed close to the ground, a reciprocating cutter means carried by the frame forward of the wheels, and normally disposed substantially at ground level, and immediately ahead of the lower end of the conveyor, an apron mounted on and extending upwardly from the cutter tangential to the upper side of the lower end of the conveyor, means for supporting the lower end of the conveyor on said cutter means, a pair of endless chains carried on sprockets disposed above the conveyor in fixed relation thereto with the lower reaches of the chains disposed substantially parallel with the lower end portion of said conveyor, a series of transverse imperforate sweep plates secured to said chains at uniformly spaced intervals therealong and extending perpendicularly from the reaches thereof substantially to the conveyor, for sweeping closely over said cutter and upwardly over said conveyor, means for driving said sweep plates and said conveyor at substantially the same speed, hydraulic means for elevating said cutter means and conveyor, means for conveying the material lifted by said conveyor to a gravity discharge area, and blower means for creating an updraft at said discharge area for removing light materials from the asparagus harvest.

4. An asparagus harvester comprising, a frame having a pair of ground engaging wheels and a draw bar for attachment to a tractor, a second frame disposed forwardly of said wheels, and connected to said main frame by pivoted links, said second frame having reciprocating cutter means affixed thereto and normally disposed at ground level, and extending the entire width of the harvester, an inclined elevating conveyor on each side of the harvester having their lower ends pivotally supported upon said cutter means, an apron extending upwardly from the cutter tangential to the upper side of the lower end of each of the conveyors, a pair of endless chains carried on sprockets disposed above each of the conveyors in fixed relation thereto with the lower reaches of the chains disposed substantially parallel with and spaced above the lower ends of each of said conveyors, a series of transverse imperforate sweep plates secured to said chains at uniformly spaced intervals therealong and extending perpendicularly from the reaches thereof substantially to the respective conveyors, for sweeping closely over said cutter and upwardly over said conveyors, means for driving said sweep plates and said conveyors at substantially the same speed, transversely horizontal conveyor means for conveying the material lifted by each of said conveyors to a central gravity discharge area, and blower means for creating an updraft at said discharge area for removing light materials from the asparagus harvest and discharging the same from the harvester.

5. A harvester in accordance with claim 4, wherein the second frame is provided with ground shoes disposed behind the cutter means for maintaining the cutter at uniform ground level.

6. A harvester in accordance with claim 4, wherein the pivoted links comprise a pair of parallelogram linkages, one arm of each of which is adjustable to tilt the cutter means to vary the proximity of the cutter means with respect to the ground.

7. A harvester in accordance with claim 6, wherein each of the linkages are provided with an extendible hydraulically actuated strut to elevate the second frame.

8. A harvester in accordance with claim 4, wherein the elevating conveyors, the sprockets, and the horizontal conveyor means are each driven by a hydraulic motor, all of which are connected in series, and driven by a common pump.

9. A harvester in accordance with claim 4 wherein the draw bar extends from the center of the harvester diagonally forward to one side, whereby the tractor may pull the apparatus from a position forward of one of the elevating conveyors.

10. A harvester for asparagus comprising, a frame having ground engaging wheels, an inclined elevating conveyor extending fore and aft, with its forward end disposed close to the ground, reciprocating cutter means carried by the frame forward of the wheels and disposed substantially at ground level, and immediately ahead of the lower end of the conveyor, an apron extending upwardly from the cutter means tangential to the upper side of the lower end of the conveyor, a pair of endless chains carried on sprockets disposed above the conveyor with the lower reaches of the chains disposed substantially parallel with and spaced above the lower end of said conveyor, a series of transverse imperforate sweep plates secured to said chains at uniformly spaced intervals therealong and extending perpendicularly from the reaches thereof substantially to the conveyor, for sweeping closely over said cutter and upwardly over said conveyor, and means for driving said sweep plates and said conveyor at substantially the same speed.

References Cited

UNITED STATES PATENTS

| | | | |
|---|---|---|---|
| 1,724,300 | 8/1929 | Moncreiffe | 56—23 |
| 2,253,044 | 8/1941 | Ommodt | 56—23 |
| 2,515,966 | 7/1950 | Polisena | 56—328 |
| 2,588,764 | 3/1952 | Richmond | 56—157 X |
| 2,608,041 | 8/1952 | Schoenrock | 56—23 |
| 2,614,379 | 10/1952 | Porter | 56—173 |
| 2,674,838 | 4/1954 | Porter | 56—177 |
| 2,729,049 | 1/1956 | Porter | 56—177 |
| 3,282,036 | 11/1966 | Paulson et al. | 56—19 |

ANTONIO F. GUIDA, Primary Examiner

P. A. RAZZANO, Assistant Examiner